Feb. 12, 1963 J. C. BROWN 3,077,128
UNIVERSAL DRILLING MACHINE
Filed Jan. 25, 1960 10 Sheets-Sheet 1

Fig. 1

INVENTOR.
Jack C. Brown
BY
C. P. Bernard
ATTORNEY

Feb. 12, 1963

J. C. BROWN 3,077,128

UNIVERSAL DRILLING MACHINE

Filed Jan. 25, 1960

INVENTOR.
Jack C. Brown
BY
R. P. Barnard
ATTORNEY

Fig. 3

INVENTOR.
Jack C. Brown
BY
C. P. Barnard
ATTORNEY

Fig. 4

Feb. 12, 1963 — J. C. BROWN — 3,077,128
UNIVERSAL DRILLING MACHINE
Filed Jan. 25, 1960 — 10 Sheets-Sheet 5

INVENTOR.
Jack C. Brown
BY R. P. Barnard
ATTORNEY

Feb. 12, 1963 J. C. BROWN 3,077,128
UNIVERSAL DRILLING MACHINE
Filed Jan. 25, 1960 10 Sheets-Sheet 6

Fig. 8

INVENTOR.
Jack C. Brown
BY
C. P. Barnard
ATTORNEY

Fig. 9

INVENTOR.
Jack C. Brown
BY
R. P. Barnard
ATTORNEY

Fig. 9a

Feb. 12, 1963  J. C. BROWN  3,077,128
UNIVERSAL DRILLING MACHINE
Filed Jan. 25, 1960  10 Sheets-Sheet 10

Fig. 10

INVENTOR.
Jack C. Brown
BY
R. P. Barnard
ATTORNEY

United States Patent Office 3,077,128
Patented Feb. 12, 1963

3,077,128
UNIVERSAL DRILLING MACHINE
Jack C. Brown, Indianapolis, Ind., assignor to General Motors Corporation, Detroit, Mich., a corporation of Delaware
Filed Jan. 25, 1960, Ser. No. 4,507
8 Claims. (Cl. 77—5)

This invention relates to material cutting machines and more particularly to a universal drilling machine.

In order to locate holes, slots and milled surfaces of many fabricated parts, special drill apparatus has previously been required for different angular setups on standard machines. In order to obtain the desired angular setup for a particular machine, a multitude of drill jigs and fixtures were required to accommodate the industry-wide variety of machining problems requiring numerous changes of complicated setups and resulting in inefficient utilization of expensive machines.

It is, therefore, a particular object of this invention to provide a machine universally adjustable to obtain any desired machining angle in relation to a workpiece.

It is a further object of this invention to provide machine apparatus that will position a workpiece and a cutting tool at any compound angle by rotary movement of a work table and parallel or angular movement in all planes of the tool relative to the workpiece and work table.

Another object of this invention is to eliminate the costly setup time previously required for machines requiring supplementary jigs and fixtures by providing a machine having a complete range of angulation between a cutting head and a workpiece.

A further object of this invention is to provide a universal machining device provided with a power source for angular adjustment of various machine parts and integrated manual mechanism to permit selective control by an operator.

An additional object of this invention is to provide a universal drilling machine having all powered angulation adjusting mechanism integrated with tool controlling power means.

Other objects and advantages will become apparent from the following detailed description wherein reference is made to the accompanying drawings in which.

Figure 1:
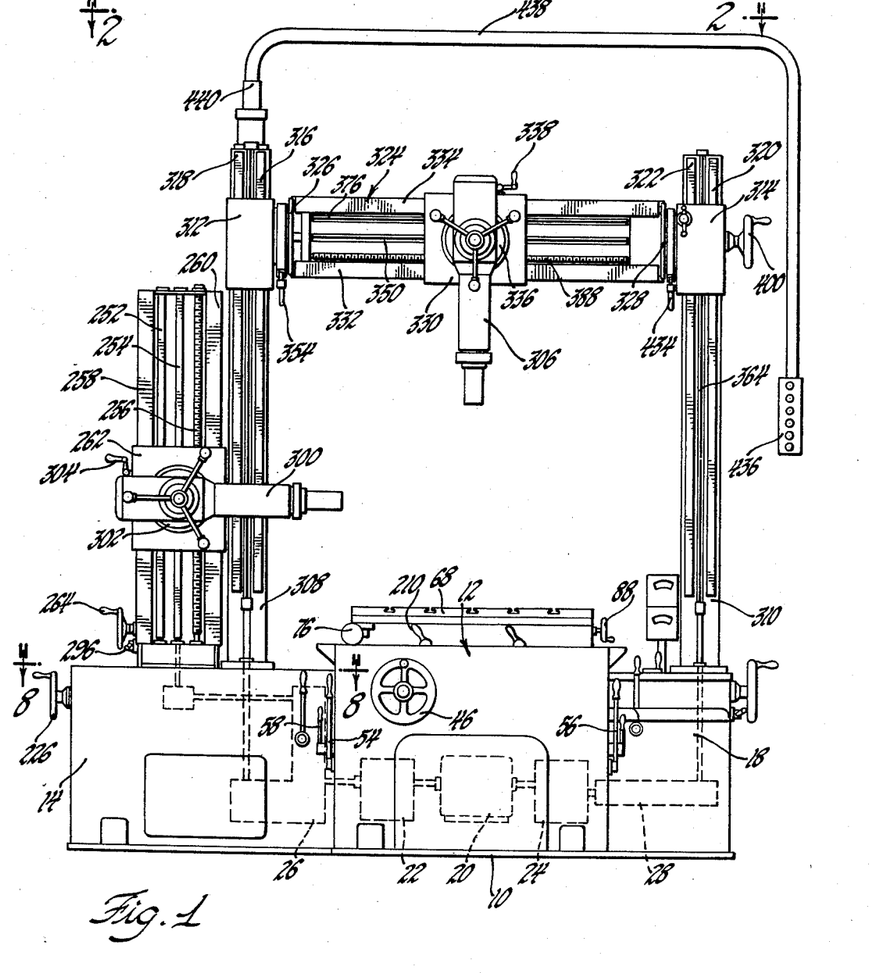
FIGURE 1 is a side elevation of the preferred embodiment of my invention.

Referring now to FIGURE 1, a frame 10 comprises a central work table and motor housing 12, a wing portion 14 and a pair of column support portions 16, 18. Conventional power apparatus is supported in the housing 12 and comprises a plurality of variable speed reduction motors 20. One of the motors is utilized for rotating the spindles of the machine and another motor is utilized to power all the feed mechanisms of the machine. Small fractional horsepower motors are mounted on conventional variable drive units 22, 24 to change the variable speed of the motors 20. The power output for the feed mechanism goes through a fast and slow speed transmission and each individual feed mechanism is provided with control levers having forward, reverse and neutral positions as found in standard drilling machine equipment. The power is transferred to the machine parts through suitable gear boxes 26, 28. Since the aforementioned motors, controls and power transfer mechanism are conventional, they are not described in detail.

Figure 2:
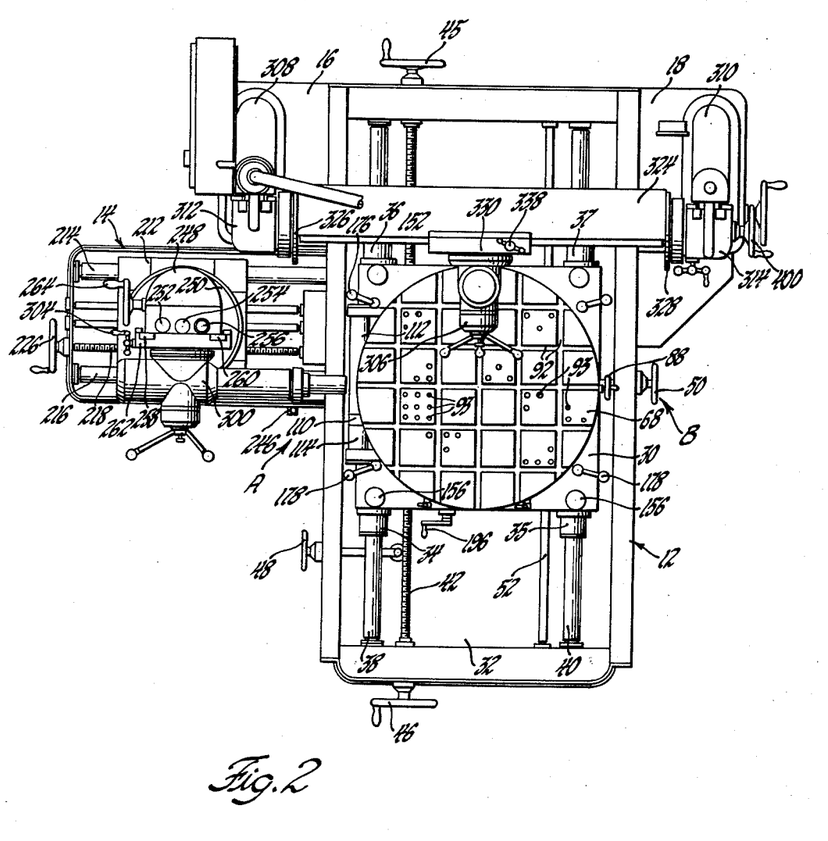
FIGURE 2 is a plan view of the embodiment shown in FIGURE 1.
Figure 4:
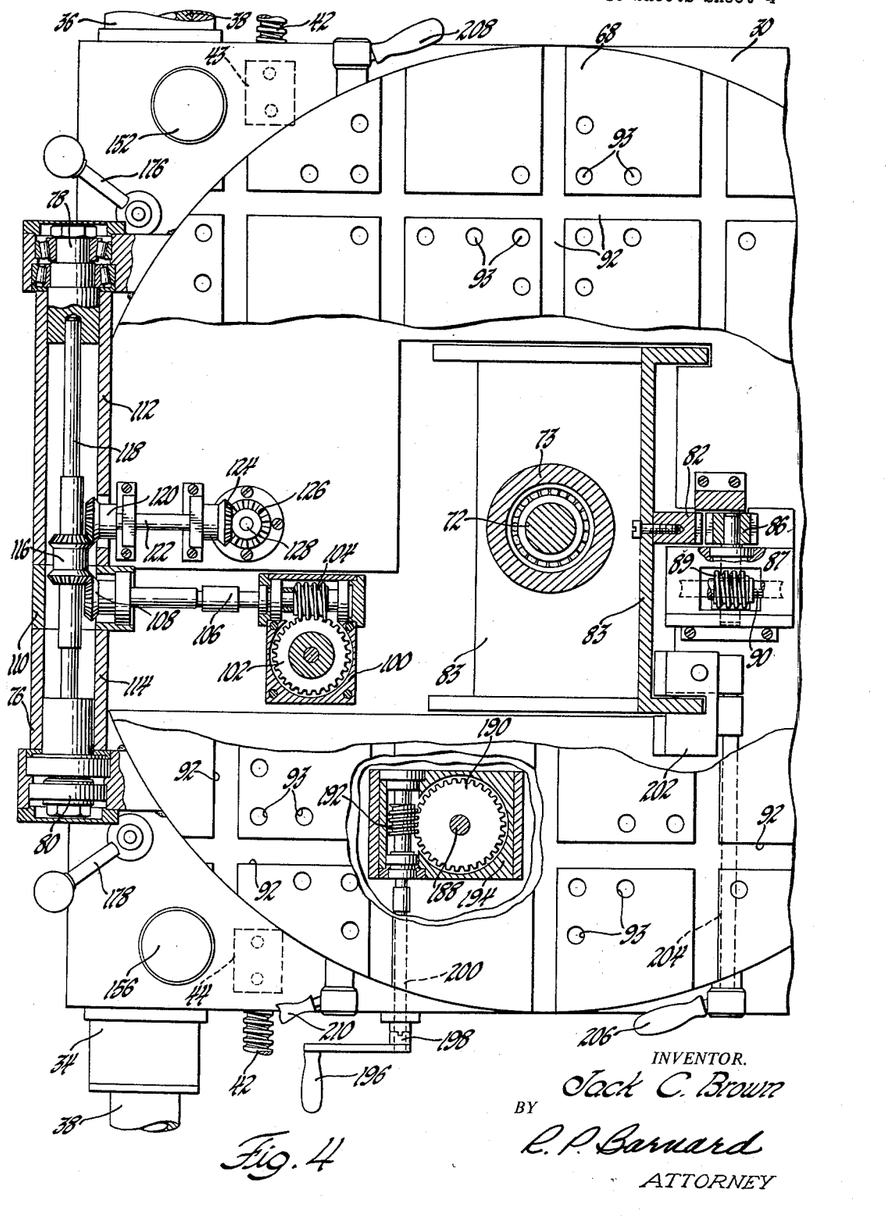
FIGURE 4 is a plan view, partly in section, of a portion of the apparatus shown in FIGURE 3.

Referring now to FIGURE 2, a work table carriage 30 is supported within an opening 32 in the central frame portion 12 by bearing members 34, 35, 36, 37 slidably supported on hard ground tubing members 38, 40. A threaded drive bar 42 extends parallel to the tube members 38, 40 within cooperating jack nuts 43, 44 (as shown in FIGURE 4) and is connected at the front, rear and sides of the machine to hand wheels 45, 46, 48, 50 for manual operation. A square drive bar 52 is rotatably, parallelly supported between the tubing members and is suitably connected by bevel gearing to a power source. Carriage power controls 54, 56, as shown in FIGURE 1, having forward, neutral and reverse positions for horizontal carriage movement, are provided around the frame 10 and located so that the machine operator can control the carriage position from a plurality of work areas A, B and from all adjustment positions around the frame.

Figure 3:
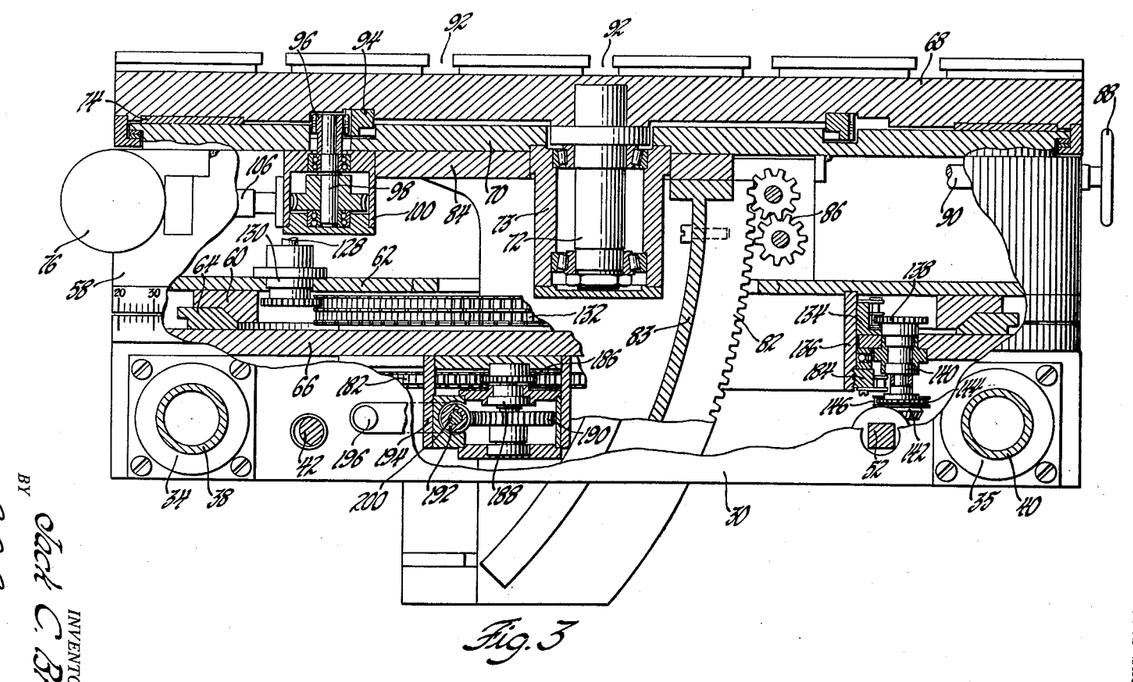
FIGURE 3 is a side elevational view of the work supporting apparatus shown in FIGURE 1.

As shown in FIGURE 3, a lower rotatable table 58 is supported by the carriage 30 and has unlimited rotary movement relative thereto about a bearing ring 60 fixed to a base plate 62 of the lower table 58 and about a bearing ring 64 fixed to a top plate 66 of the carriage 30. An upper rotatable work table 68 is supported by a stationary intermediate plate 70 on the lower table 58 and has unlimited rotary movement relative thereto about a central pivot shaft 72 supported in a depending housing 73 and about a bearing ring 74. The upper rotatable work table 68 is pivotally connected to the lower rotatable table 58 by a hinge-type connection 76 comprising spaced trunnions 78, 80, as shown in FIGURE 4, to provide a pivotal axis about which the work table 68 may be inclined by means of an arcuate gear segment 82 that abuts a back-up plate 84. The gear segment 82 is fixed to a guide member 83 and is centrally housed within the table 58 and the carriage 30. Gear segment drive mechanism comprising suitable reduction gearing 86, a worm gear 87 and a worm 89 connected by a hand wheel 88 through a shaft extension 90 is provided to elevate the table 68 relative to the table 58. The work table 68 is provided with a top surface having suitable workpiece fastening means comprising key slots 92 or alternatively a plurality of threaded holes 93 as shown in FIGURE 2. A ring gear 94 is secured to an inner hub of the work table 68 and is drivingly engaged by a pinion 96 mounted on a shaft 98 that extends downwardly within a depending gear housing 100 which is fixed to the intermediate plate 70.

Referring now to FIGURE 4, a worm gear 102 and a worm 104 are supported within the housing 100. A drive shaft 106 interconnects the worm 104 and a bevel gear 108 rotatably mounted in a transverse access hole of a rotatable tube section 110. The tube section 110 is rotatably and coaxially mounted between tube members 112, 114 that interconnect the trunnions 78, 80. The bevel gear 108 is connected within a housing formed by the tube members 110, 112, 114 to bevel gearing 116 mounted on an idler shaft 118 and connected to a bevel gear 20 fixed to a drive shaft 122 extending through an opening in the wall of the tube 112. Bevel gears 124, 126 are drivingly associated with the shaft 122 and are driven by a shaft 128 extending downwardly through the base plate 62 of the lower table 58 and fixed to a sprocket wheel 130 as shown in FIGURE 3.

Figures 5, 7:
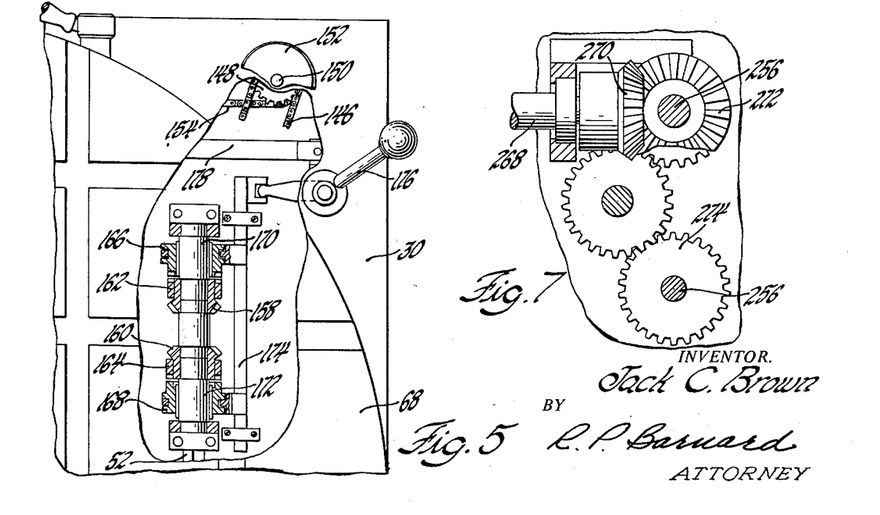
FIGURE 5 is a plan view, partly in section, of another portion of the apparatus shown in FIGURE 3.
FIGURE 7 is a partial, sectional view taken along the line 7—7 in FIGURE 6.

Referring now to FIGURE 3, sprocket wheel 130 is engaged with a double chain 132 that is fixed to a bearing ring 134 slidably mounted about the periphery of an annulus 136 depending from the base plate 62 of the lower rotary table 58. A drive sprocket 138 is connected to the double chain 132 and is fixed to a drive shaft 140 that also supports a power input bevel gear 142. A sprocket wheel 144 is mounted on the shaft 140 and is connected to a chain 146. As shown in FIGURE 5, a sprocket wheel 148 is mounted on a shaft 150 having a hand knob 152 fixed thereto and is drivingly associated with the chain 146 to provide manually operable means to rotate the upper work table 68 as shown in FIGURE 5. Additional hand knobs, as shown by knob 156 in FIGURE 4, may be placed about the periphery of the carriage 30 and drivingly associated with chain means 154 to provide means of operating the drive chain 146 at other stations around the carriage member 30. A clutch mechanism is shown in FIGURE 5 to control power transfer from the drive bar 52 to the bevel gear 142 and comprises freely rotating bevel gears 158, 160 having clutch members 162, 164 fixed thereto. Collar clutch members 166, 168 are keyed to shaft members 170, 172 that are driven by the power drive bar 52. A shift bar 174 is drivingly connected to the collar clutches 166, 168 and is operatively associated with a shift lever 176. Additional control linkage 178 extends about the outer periphery of the carriage 30 to additional shift levers such as a lever 178 shown in FIGURE 4.

Referring now to FIGURE 3, the rotating mechanism for the lower table 58 comprises a chain type ring gear fixed to an internally threaded ring 184 that is threaded onto the lower end of the depending annulus 136. A drive sprocket 186 is secured to a shaft 188 and connected to a worm gear 190 and a driving worm 192 supported within the depending housing 194. As shown in detail in FIGURE 4, the worm 192 is manually operable by a hand crank 196 through clutch mechanism 198 and a shaft 200. The chain ring gear 182 may also be connected by sprocket wheel and clutch mechanism (not shown) similar to the sprocket 138 and the clutch mechanism shown in FIGURE 5 to provide power operation of the upper work table 68.

Referring now to FIGURE 4, a suitable locking mechanism 202 is adapted to clamp a portion of the guide member 83 and is connected by a shaft 204 to a manually operable handle 206 so that the table 58 may be locked in the desired elevated position. Likewise, conventional locking means are also provided for the rotary tables and are actuable by hand levers 208, 210 provided around the periphery of the tables.

In operation of the tables and the carriage, power is transferred to the jack screw 42 through conventional clutch and transmission mechanisms that are controlled by the operator through the levers 54, 56 and provide for forward, neutral and reverse operational positions. Thus, the jack screw 42 may be reversely rotated by the power apparatus to drive the carriage to and fro in a confined path defined by the trackway provided by the tubing members 38, 40 by the coaction of the jack nuts 43, 44 on the drive screw 42. In addition, the hand wheels 45, 46, 48 and 50 are clutchably associated with the drive screw 42 so that the carriage may be manually driven from a plurality of stations around the machine. The top table 68 may be inclined relative to the lower table 58 by operation of the handle 88 which drives the gear train 86 to actuate the gear segment 82 and force the guide housing 83 upwardly against the support plates 70, 84 of the upper work table 68 which is pivoted about the trunnions 78, 80 of the hinge-like connection 76. When the table 68 has been elevated to the desired position, it may be locked in place by actuation of the locking mechanism 202 through the control lever 206. In the inclined position the work table may be rotated through 360 degrees by provision of power transfer means that rotate about the axis of the trunnions 78, 80 and move upwardly with the work table. Thus, in any position, the work table rotating ring gear 94 is driven by the gear 96, the shaft 98, the worm gear 102, the screw 104, the shaft 106 and bevel gear 108 that is supported within the rotatable tube section 110. The rest of the power transfer mechanism for rotating the work table remains stationary and comprises power transfer through the bevel gearing 116 rotatably mounted on the shaft 118, the bevel gear 120, the shaft 122, the bevel gears 124, 126, the shaft 128, the sprocket 130, the double chain ring gear 132, the sprocket wheel 138, the shaft 140, the bevel gear 142, the clutch mechanism shown in FIGURE 5, and the drive bar 52. The upper table may be manually rotated by means of the sprocket 144 mounted on the bevel gear 142, the chain 146 and one of a plurality of hand knobs 152, 156. It is to be noted that the double chain ring gear is mounted on a bearing ring 134 which is freely rotatable about the housing extension 136 of the lower table 58 so that the tables have unlimited rotary movement relative to one another. As shown in FIGURE 3 the mechanism for rotating the lower table 58 comprises a chain ring gear 182 fixed to the depending housing annulus 136 by a threaded ring 184. The chain ring gear 182 may be driven manually through the sprocket wheel 186, the shaft 188, the worm gear 190 and the worm 192 by the handle 196 through the clutch 198 and the shaft 200. For power operation a second sprocket wheel may be provided in engagement with the chain ring gear 182 and be driven by the drive bar 52 through suitable gearing and clutch mechanism similar to the mechanism described for controlling rotation of the work table 68. The drive bar 52 is connected to the power source in the central section 12 by a conventional clutch and transmission arrangement which provides fast, neutral and slow speeds controllable by the control levers 58, 60.

Thus, the carriage 30 may be linearly translated fore and aft on the tube track by power or manually, the table 58 may be rotated relative to the carriage 30 through 360 degrees in either direction by power or manually, and the work table 68 may be inclined relative to the table 58 and rotated relative thereto through 360 degrees in either direction in the horizontal or any of the inclined positions by power or manual means. Consequently, when a workpiece is fastened to the work table top by means of the key slots 92 or threaded holes 93, the workpiece may be angulated and rotated by multiple combinations of movements including angulation of the workpiece, rotation in the angulated plane of the workpiece and rotation of the angulated workpiece in a horizontal plane.

Figure 6:
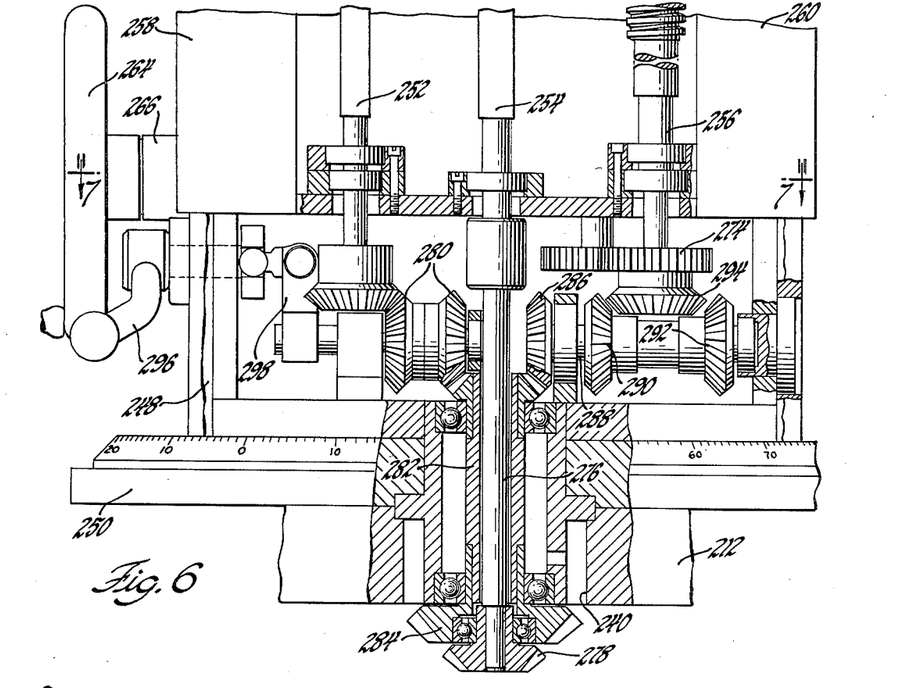
FIGURE 6 is a side elevation, partly in section, of a portion of the side drill head column shown in FIGURE 1.
Figure 8:
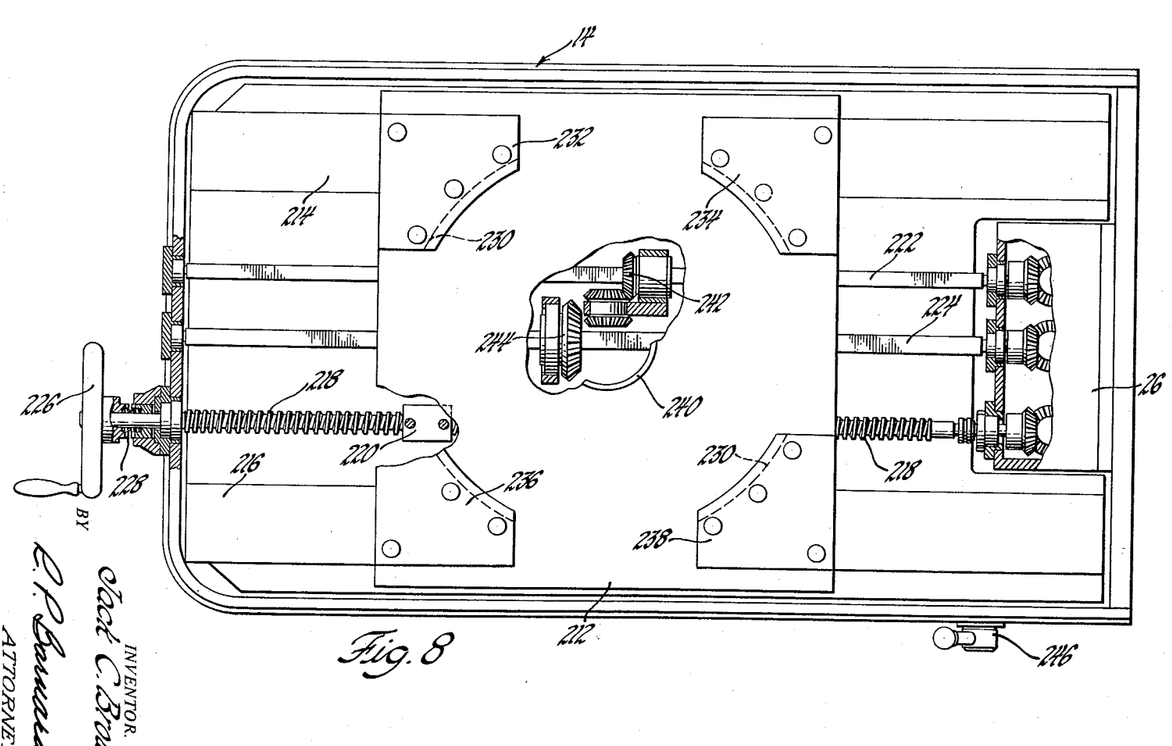
FIGURE 8 is a sectional view taken along the line 8—8 in FIGURE 1.

As shown in FIGURES 2, and 8, the machine is further provided with special side drill head supporting apparatus comprising a stanchion carriage 212 slidably supported on hard ground tubing members 214, 216 that extend transversely of the trackway provided by the table carrying tubing members 38, 40. A carriage drive screw 218 is associated with a jack nut 220 fixed to the carriage 212 and square drive bar members 222, 224 are located centrally of the tubing members 214, 216 and connected to the power source through the gear box 26. A hand wheel 226 is connected by a clutch mechanism 228 to the drive screw 218 to provide manual, linear adjustment of the carriage 212. The stanchion carriage 212 is provided with a circular trackway 230 formed by curved grooves in support plates 232, 234, 236, 238, and has a centrally located access hole 240 that provides power transferring communication with power take-off bevel gearing 242 slidably fixed to the drive bar 222 and power take-off bevel gear 244 slidably fixed to the drive bar 224. The bevel gears 242, 244 are fixed to the carriage 212 and adapted for sliding movement therewith while maintaining a fixed position with respect to the access hole 240. A clutch control lever 246 controls suitable clutching mechanism associated with the drive screw gearing in the gear box 26 to provide for fore and aft powered movement of the stanchion carriage 212. A stanchion 248 is rotatably supported on the carriage member 212 by a rotary plate 250 and has unlimited rotary movement relative thereto in the trackway 230 about an axis transverse to the path defined by movement of the carriage 212 on the tubes 214, 216. The stanchion 248 is provided with a central cavity that houses a feed drive bar extension 252, a spindle drive bar extension 254 and, in addition, a drive screw 256. The stanchion is provided with slide rails 258, 260 that slidably support a spindle head carriage 262 which is reciprocable on the slide rails by means of the drive screw 256 or manually operable drive mechanism, as shown in FIGURES 6 and 7, comprising a hand wheel 264, a clutch mechanism 266, linkage 268 and bevel gearing 270 that drives a gear 274 fixed to the drive screw extension 256. As shown in detail in FIGURE 6, the spindle drive bar extension 254 is connected by a shaft 276 and a bevel gear 278 to the bevel gear 244 within the access opening 240. The power transfer means for the feed drive bar extension 252 comprise bevel gearing 280, a drive sleeve 282 and a bevel gear 284 powered by the bevel gearing 242 within the access opening 240. The axis of rotation of the bevel gears 278, 284 are coincident with the axis of rotation of the stanchion 248 to maintain power transferring engagement of the bevel gearing and permit unlimited rotary movement of the stanchion relative to the carriage 212. The drive screw 256 is also driven by the bevel gear 284 and the drive sleeve 282 through a bevel gear 286 that is drivingly connected to a shaft 288. Bevel gears 290, 292 are freely supported on a sleeve concentric with the shaft 288 and are provided with clutch mechanism for alternately engaging the bevel gears 290, 292 with the drive shaft 288 and simultaneously engaging the clutched gear with the power take-off bevel gear 294. A clutch control lever 296 is associated with linkage 298 whereby the bevel gears 290, 292 may be alternately clutched to the drive shaft 288 and engaged with the bevel gear 294 to reverse rotation of the drive screw 256 to alternately raise and lower the spindle head carriage 262.

Referring again to FIGURES 1 and 2, a spindle head or drill head 300, as described in my copending application Ser. No. 4,508 Universal Machining Spindle Head, filed January 25, 1960, is rotatably secured to the carriage 262 by a locking plate 302 to provide unlimited rotary movement of the spindle head relative to the carriage. A central access hole in the spindle head carriage 262 accommodates bevel gearing slidably secured to the drive bar extensions 252, 254 and slidable with the carriage 262 on the slide rails 258, 260. A corresponding access hole in the portion of the spindle head associated with the locking plate 302 accommodates bevel gearing connected to the spindle and feed drive mechanisms of the spindle head 300 and having rotational axes coincident with the axis of rotation of the spindle head to maintain power transferring engagement with the bevel gearing mounted on the drive extensions and permit unlimited rotary movement of the spindle head relative to the carriage spindle head 262. Any suitable mechanism, such as a ring gear, a driving pinion and control linkage, may be provided for rotating the stanchion relative to the carriage 212 and for rotating the spindle 300 relative to the spindle carriage 262.

Thus in operation, the side spindle head 300 may be variably spaced from the path of movement of a workpiece fixed to the work table 58 by reciprocatory movement of the stanchion carriage 212 in a confined path along the trackway provided by the tubes 214, 216 and by reciprocatory movement of the spindle head carriage 262 along the slide rails 258, 260, upwardly and downwardly, transversely to the path of the stanchion carriage 212. In addition, the spindle head may be rotated through 360 degrees in two transverse planes about transverse axes, the angular positions of which, relative to each other, may be completely angulated because the stanchion 248 has unlimited rotary movement relative to the stanchion carriage 212 and the spindle head 300 has unlimited rotary movement relative to the spindle head carriage 262. It will be seen that the drill head is positionable relative to the workpiece by rotation of the drill head about a first axis transverse to the axis of rotation of the spindle and by rotation of the first axis of rotation about a second transverse axis.

Figure 9:
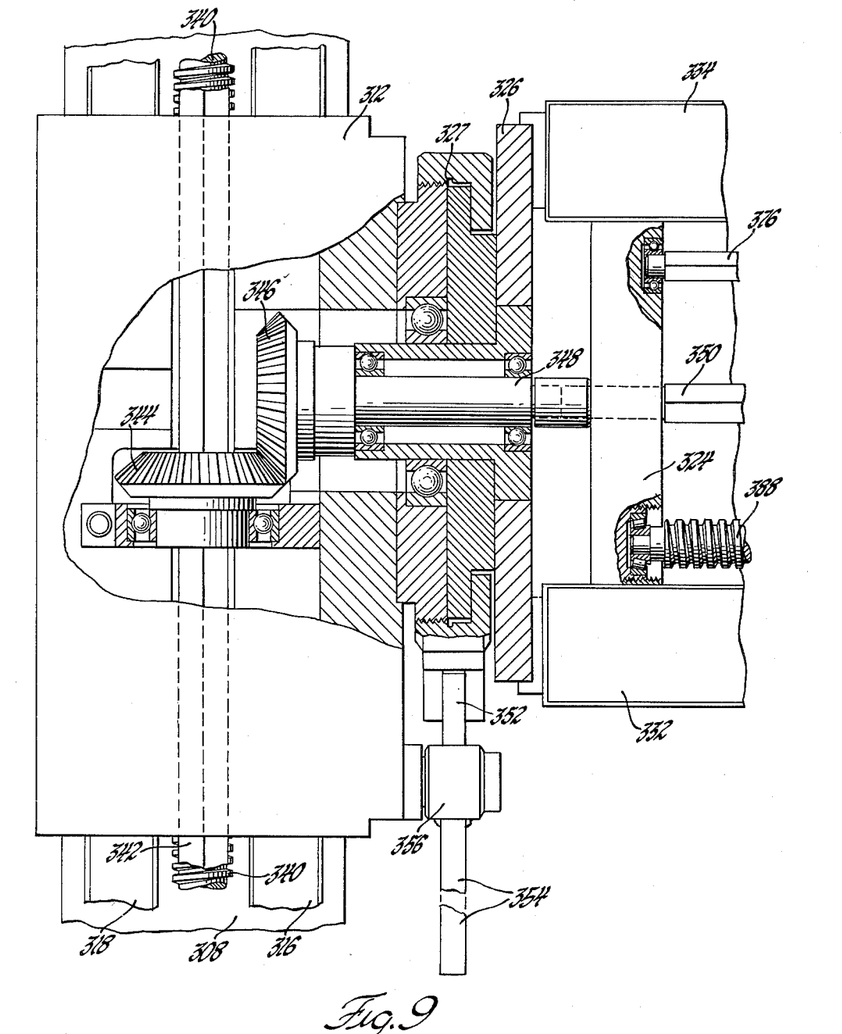
FIGURE 9 is a side elevation, partly in section, of a portion of the central drill head cross support shown in FIGURE 1.

Referring now to FIGURE 1, another special spindle head or drill head 306 is provided on special overhead supporting apparatus comprising support columns 308, 310 that are suitably fixed to the column support portions 16, 18 located intermediate the ends of the central frame portion 12 and adjacent the trackway provided by the tubes 38, 40. Carriage members 312, 314 are slidably supported on the support columns 308, 310 by slide rails 316, 318 and 320, 322. A cross support 324 is rotatably secured by rotary plates 326, 328 to the carriage members 312, 314. A spindle carriage 330 is reciprocably supported on guide rails 332, 334 of the cross support 324 and the spindle head 306 is fixed to the carriage 330 by a locking plate 336 that permits unlimited rotary movement of the spindle head relative to the carriage through suitable mechanism, hereinafter described in detail, actuated by the hand crank 338. As shown in detail in FIGURE 9, a drive screw 340 extends upwardly from the gear box 26 into the column support 308 between the guide rails 316, 318 and is cooperatively engaged with a screw nut fastened to the carriage 312 so that rotation of the drive screw will cause up-and-down reciprocatory movement of the carriage on the guide rails. A drive bar 342 also extends upwardly from the gear box 26 parallel to and closely adjacent the drive screw 340. A bevel gear 344 is slidably secured to the drive bar 342 and drivingly engaged with a bevel gear 346 that is fixed to the carriage 312 and has an axis of rotation coincident with the axis of rotation of the cross support 324. A shaft extension 348 is drivingly associated with a spindle drive bar extension 350 that is rotatably supported within the cross support 324. Suitable locking mechanism 352 is cooperatively associated with the rotary plate 326 of the cross rail and is operable by a hand lever 354 fixed to the carriage 312 by a pivotal connection 356 to clamp the cross support to the carriage.

Figure 9A:
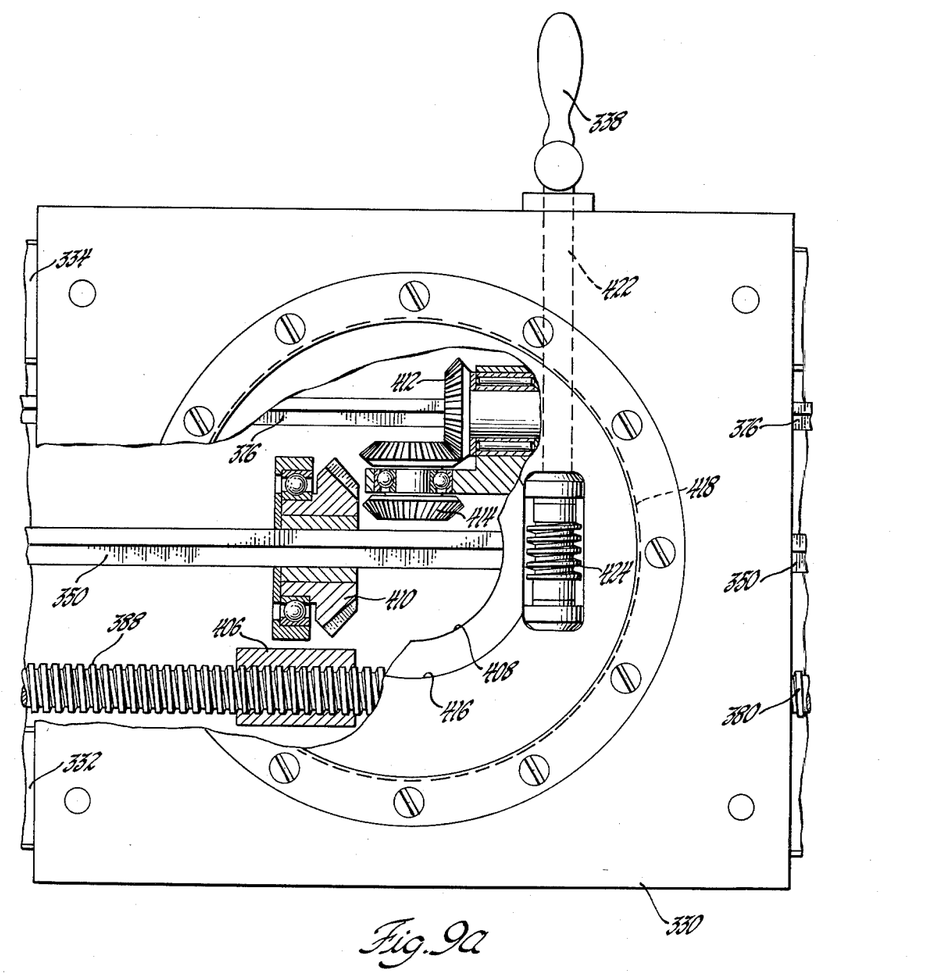
FIGURE 9a is a side elevation, partly in section, of the central drill head support apparatus shown in FIGURE 1.
Figure 9B:
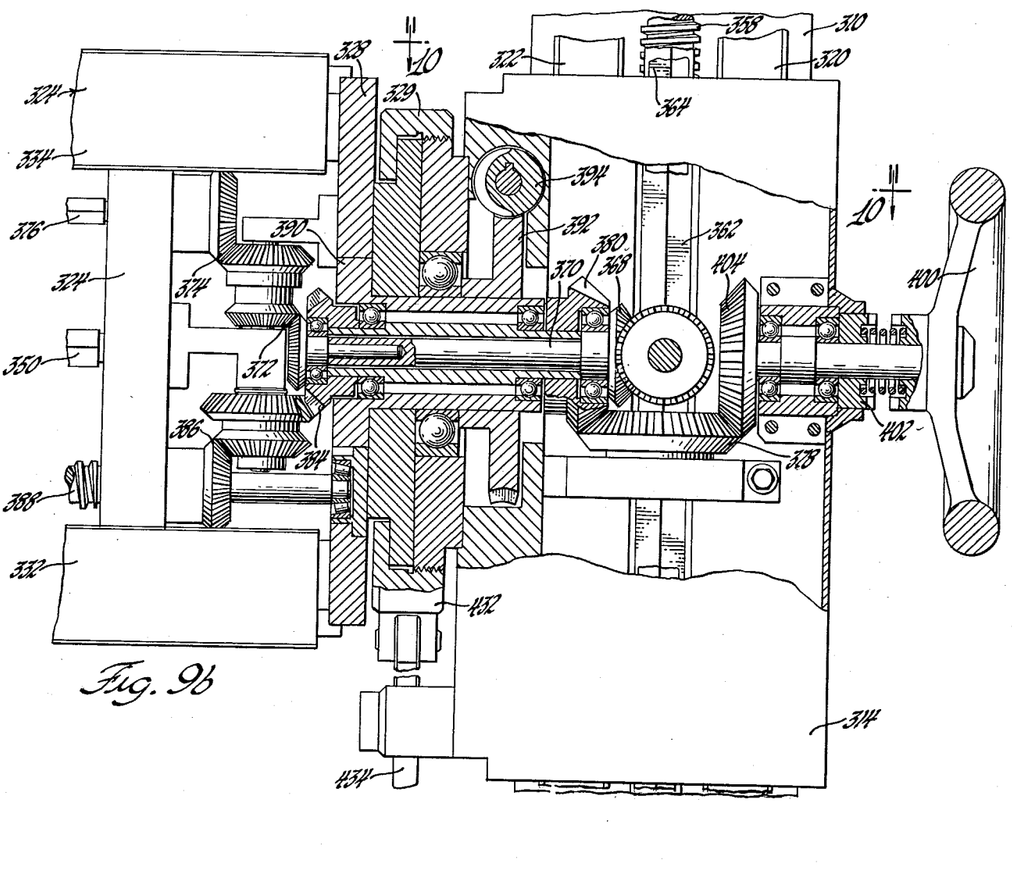
FIGURE 9b is a side elevation, partly in section, of another portion of the central drill head cross support.
Figure 10:
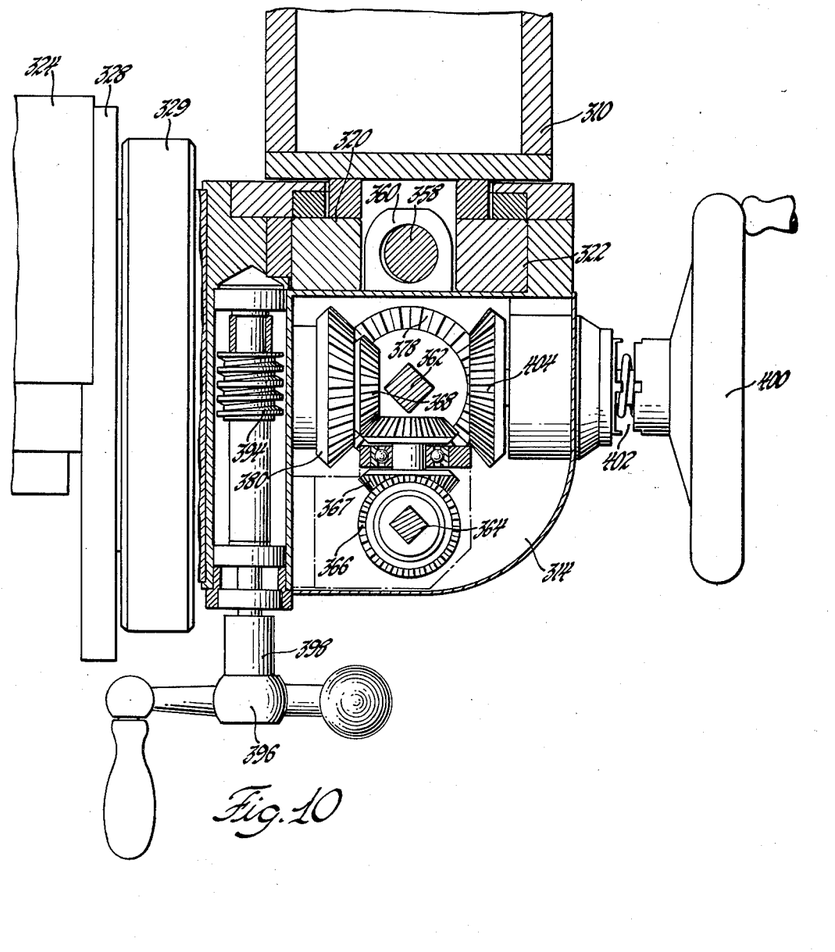
FIGURE 10 is a sectional view taken along the line 10—10 in FIGURE 9b.

Referring now to FIGURE 9b and FIGURE 10, it will be seen that the cross support carriage 314 is reciprocably driven on the guide rails 320, 322 by a drive screw 358 extending from the gear box 28 between the guide rails 320, 322 in the support column 310 and associated with a jack nut 360 fixed to the carriage 314. A spindle head carriage drive bar 362 and a spindle feed drive bar 364 also extend from the gear box 28 parallelly and closely adjacent the drive screw 358. Power is transferred from the spindle feed drive bar 364 through a bevel gear 366 slidably fixed thereto through a bevel gear 367, through bevel gears 368, through a drive shaft 370, through bevel gears 372 and through bevel gears 374 to a spindle feed drive bar extension 376 that is rotatably supported by the cross support 324. Power is transferred from the spindle head carriage drive bar extension 362 through a bevel gear 378 slidably fixed thereto, through a bevel gear 380, a drive sleeve 382, bevel gears 384 and bevel gears 386 to a spindle head carriage drive screw 388 which is rotatably supported in the cross support 324. A bushing member 390 is fixed to the rotary plate 328 and concentrically mounted about the drive shaft 370 and the drive sleeve 382. Mechanism comprising a worm gear 392 that is drivingly associated with a worm 394 connected to a hand crank 396 by a shaft 398 is provided to rotate the bushing 390 and the cross support 324 relative to the cross support carriages 312, 314. The axes of rotation of the bevel gears 368, 372, 380, 384 are coincident with the axis of rotation of the cross support 324 to maintain the power transferring connection and permit unlimited rotary movement of the cross support relative to the cross support carriages. A hand wheel 400 is connected through suitable clutching mechanism 402 to a bevel gear 404 to provide for manual adjustment of the spindle head carriage 324 through the bevel gear 378 and the aforedescribed power transfer mechanism.

Referring now to FIGURE 9a, spindle head carriage 330 is shown as comprising a jack nut 406 fixed to the carriage and cooperable with the drive screw 388 to drive the carriage along the guide rails 332, 334. The carriage is provided with a central access hole 408 that accommodates a bevel gear 410 fixed to the carriage member and slidably secured to the spindle drive bar extension 350. A bevel gear 412 is slidably supported on the feed drive bar 376 and is fixed to the carriage 330 and drivingly associated with the bevel gear 414 located in the access hole 408. The spindle head 306 is rotatably secured within a counterbore 416 by threaded engagement of the locking plate 336 with a threaded fastening ring 418 that is suitably secured to the carriage 330. A hand crank 338 extends from the side of the carriage 330 and is fixed to a shaft 422 that drives spindle head rotating mechanism comprising a worm 424 that drivingly engages a worm gear (not shown) fixed to the portion of the spindle head rotatably supported within the counterbore 416. Similar rotational mechanism is provided for the side drill head as hereinbefore described. The power connection between the spindle head 306 and the carriage 330 is identical to the previously described power connection between the side spindle head 300 and the carriage 262. A locking mechanism 432 is associated with the cross support and operable by a lever 434. Additional power control means may be provided by an electrical control box 436 suspended on an arm 438 having a pivotal connection 440 to permit variable positioning of the control box in accord with the machine operator's position.

Thus, in operation the central drill head 306 may be reciprocated upwardly and downwardly on the support columns 308, 310 by coaction of the screw drive bars 340, 358 with their respective jack nuts that are fixed to the carriage members 312, 314. In addition, the drill head 306 may be reciprocated in a transverse plane between the column supports 308, 310 on the cross support 324. The drill head 306 is provided with rotational means permitting unlimited rotary movement of the drill head in a vertical plane and additional unlimited rotary movement in a second plane transverse to the first plane. That is, the drill head is rotatable about a first axis of rotation and the first axis of rotation is rotatable about a second axis of rotation transverse to the first axis so that planes defined by movement of a point on the spindle head about different rotative axes are transverse to one another. It is to be noted that the axis of rotation of the drill head spindles is transverse to the axis of rotation of the drill heads.

Thus, the overall operation of the machine permits universal positioning and angulation of a workpiece relative to drill heads without changing the initial setup of the workpiece in the machine. After a workpiece is once clamped to the top of the work table 68, it may be suitably positioned by any combination of movements of the work tables including linear translatory movement of the work table carriage 30, fore and aft, between the extremities of a path defined by the track provided by the tubing members. At any position along the track the work tables may be rotated relative to the carriage through any angular movement desired and the work table 68 may be inclined relative to the lower table 58 so that the angles obtainable are further compounded. When the work table 68 is in the inclined position, it is further rotatable relative to its base plate through 360 degrees and the table 58 remains rotatably supported on the table carriage 30 and has unlimited rotary movement relative thereto. Continual unlimited rotation of the work table 68 throughout its inclined positions is permitted by the special connection to the power source through the pivotal tube 110 mounted between the tube members 112, 114 because, as the work table 68 is elevated by the sector gear 82 about the trunnions 78, 80, the power transmitting shaft 106 is rotated therewith in the pivotal tube 110. In addition to being able to compound angles and position the workpiece on the work table carriage, further means of obtaining a particular cutting angle are provided by the special spindle heads and support mechanisms. The spindle head 306 is slidably carried by the cross support 324 in alignment with the translatory path of the work table carriage and is positionable relative thereto by sliding movement of the carriage 330 between the support columns 308, 310. In addition, the cross support and spindle head are slidable in a vertical plane on the support columns 308, 310. To further accommodate intricate positioning of the spindle head and the workpiece, the cross support has unlimited rotary movement about an axis parallel to the plane of movement of the work table carriage and the spindle head itself has unlimited rotary movement about an axis transverse to and rotatable about the axis of rotation of the cross rail. In order to compound angles with greater versatility, an additional side spindle head is slidably mounted on the stanchion 248 that is rotatably supported on a slidable carriage 212 and has unlimited rotary movement relative thereto. The spindle head 300 is also rotatably mounted on the reciprocable spindle head carriage 262 and has unlimited rotary movement relative thereto. As will be understood, the spindle heads and the workpiece may be universally angulated relative to one another and both power and manual position mechanisms are provided for all phases of the angulation of all the parts so that the operator may exert independent control of any particular apparatus at any time. The mechanism provided permits the use of a central power source and a centrally housed power transfer mechanism adapted to transfer power, in series, to individual components while permitting relative movement of adjacent components.

Thus, it is apparent that I have provided a new drilling machine which is capable of machining parts at angles relative to the workpiece which heretofore could only be achieved through expensive and complicated jigs and fixtures which were set up by hand on conventional machinery. Some changes in the details of construction and the coaction of the parts may be considered within the spirit and scope of the invention as defined by the appended claims.

I claim:

1. A universal drilling machine comprising a frame having a central portion, a first track provided in said central portion, another portion of said frame provided with a second track spaced from and adjacent to said first track, a support portion of said frame spaced outwardly adjacent said first track, a work table carriage supported for linear horizontal movement on said first track, a lower rotary support table fixed to said carriage and having unlimited rotary movement thereon, an upper rotary work table pivotally connected to and supported by said lower rotary support table, said upper work table comprising rotatably connected upper and lower portions and having unlimited rotary movement therebetween, actuating mechanism for pivotally moving all portions of said upper work table outwardly from a horizontal position parallel to said rotary support table to a plurality of positions inclined thereto, fastening means to secure a workpiece on said upper portion of said upper rotary work table, means to translate said work table carriage in a reciprocatory path on said first track, a slide member reciprocably fixed to said second track, a vertical stanchion secured to said slide and having unlimited rotary movement thereon, a third vertical linear track provided on said stanchion, a first spindle head carriage associated with and vertically reciprocable on said third track, means to translate said first spindle head carriage in a reciprocatory path on said third track, a first spindle head rotatably carried by said first spindle head carriage and having unlimited rotary movement thereon, means to rotate said first spindle head relative to said first spindle head carriage, support means extending upwardly from said support portion of said frame and spaced outwardly of said first track and the reciprocatory path of said work table carriage, a fourth vertical track provided by said support means, a cross support member rotatably and slidably supported on said fourth track and having unlimited rotary movement thereon and extending over said reciprocatory path of said work table carriage, a fifth track provided on said cross support member, a second spindle head carriage associated with and reciprocable on said fifth track, means to translate said second spindle head carriage in a reciprocatory path on said fifth track above and across said reciprocatory path of said work table carriage, a second spindle head rotatably carried by said second spindle head carriage and having unlimited rotary movement thereon about an axis transverse to the axis of rotation of said cross support member, and means to rotate said spindle head on said second spindle head carriage.

2. The universal drilling machine as defined in claim 1 and comprising a power source located within said central portion, and power transfer mechanism connected to said power source and extending to said first and second spindle heads within the confines of said frame portions, said stanchions and said cross support.

3. A work table comprising a rotatable support, a rotatable work support member rotatably carried by said first rotatable support, a pivotal connection between said rotatable support and said rotatable work support member, means to incline said rotatable work support member to said rotatable support about said pivotal connection, a carriage adapted to carry said rotatable support and said rotatable support member in a confined path, means to translate said carriage along said path, a cross support extending above the work support member and supported by stanchions spaced outwardly of the translatory path of said carriage, means to reciprocate said cross support relative to said carriage between said stanchions, a first spindle head rotatably mounted on said cross support, means to rotate said cross support about a first axis of rotation and means to rotate said first spindle head about a second axis of rotation transverse to said first axis of rotation, a second spindle head, a stanchion rotatably supporting said second spindle head about a rotatable axis of rotation, means to reciprocate said spindle head on said stanchion, and means to translate said stanchion transversely to the translatory path of said work table carriage.

4. A drilling machine comprising, a work table, fastening means provided on said work table to secure a workpiece, a first work table support member, a rotary connection between said work table and said work table support member, means to rotate said work table relative to said work table support member about said rotary connection, a second work table support member, a pivotal connection interconnecting said first work table support member and said second work table support member, and defining a pivotal axis located at and tangent to one edge of said work table to effect movement of all portions of said work table about said pivotal connection in a common direction away from said first work table support member, means to pivot said work table about said pivotal connection to incline said work table relative to said second work table support member, a carriage member supporting said second work table supporting member, means to rotate said second work table support member relative to said carriage member, a trackway, guide means slidably supporting said carriage member on said trackway, actuating means drivingly associated with said carriage member for causing movement of said carriage member on said trackway whereby said workpiece is movable in a confined path determined by said trackway and is rotatable relative thereto in a plurality of separate planes and is simultaneously rotatable relative thereto in a fixed plane throughout rotation of said workpiece in any of said plurality of separate planes, a first drill head, support means for said first drill head being spaced outwardly from said trackway, adjusting means to vary the spacing from said trackway of said support means, a first rotary connection between said first drill head and said support means, a second rotary connection between said support means and said adjusting means, means to rotate said support means relative to said adjusting means, a second drill head, support apparatus for supporting said second drill head above said trackway, actuating means to vary the position of said second drill head above said trackway, a third rotary connection between said second drill head and said support apparatus, a fourth rotary connection between said support apparatus and said actuating means, means to rotate said support apparatus for said second drill head relative to said actuating means, slide means interconnecting said second drill head and said support apparatus for said second drill head, means to move said second drill head relative to said support apparatus for said second drill head, and actuating mechanisms to rotate said first drill head about said first rotary connection and to rotate said second drill head about said third rotary connection whereby the spacing of said drill heads relative to said workpiece is varied and the angle of approach of said drill heads relative to said workpiece is variable by rotation of said drill heads about rotational axes and by rotation of said rotational axes about transverse rotational axes.

5. A work supporting device comprising a table support member having a central cavity, a trackway, guide means slidably supporting said table support member on said trackway, a bearing ring fixed to said table support member and providing a circular trackway, an intermediate rotatable table having a central opening aligned with said central cavity, bearing means fixed to said intermediate rotatable table and cooperably slidably supported on said circular trackway, an annulus downwardly depending from said intermediate rotatable table into said central cavity and concentrically positioned relative to said circular trackway, an upper work table rotatively slidable relative to and supported by said intermediate table, a pivotal connection linking said upper work table and said intermediate table, said upper work table comprising a top workpiece receiving portion and a support portion, bearing means interposed between said top portion and said support portion, a rotary connection centrally rotatably linking said top portion and said support portion, a guide member depending from said support portion into said central opening and said central cavity, drive means for moving said guide member upwardly to actuate all portions of said upper work table outwardly away from said intermediate rotatable table about said pivotal connection to a plurality of inclined positions relative to said intermediate table, gear means for rotating said top portion of said work table about said rotary connection on said bearing means relative to said intermediate table, a housing depending from the support plate and supporting part of said gear means within said intermediate table, a power transfer connection extending from said housing to said pivotal connection, rotary power transfer means associated with said pivotal connection to maintain engagement with said power transfer connection at all of said inclined positions, a first ring gear member freely mounted concentrically about the periphery of said depending annulus, power transfer linkage interconnecting said first ring gear gear member and said rotary power transfer means, actuating mechanism drivingly associated with said first ring gear member whereby said top portion of said upper work table is rotatable about said rotary connection relative to said intermediate table, a second ring gear member fixed to said depending annulus, and actuating means drivingly associated with said second ring gear member whereby said intermediate table is rotatable relative to said table support member.

6. Machining apparatus comprising a work table, means to secure a workpiece to said work table, a drill head having spindle drive and feed mechanism, support means for said drill head, a trackway, means slidably securing said support means on said trackway, power transferring drive bars rotatably supported adjacent said trackway, power take-off gears slidably supported on said power transferring drive bars and fixed to said support means within an access hole therein, rotary means interposed between said drill head and said support member and having an axis of rotation aligned with said access hole, and power transfer mechanism concentrically mounted about said axis of rotation and rotatively mounted relative to said drill head and linking said power take-off gears and said spindle drive and feed mechanism whereby said drill head is provided with unlimited rotary movement relative to said support means and said power take-off gears.

7. Machining apparatus comprising a work table, means to secure a workpiece on said work table, a drill head housing having spindle drive and feed mechanism, a carriage member for said drill head housing, a rotary connection between said drill head housing and said carriage member providing a first axis of rotation for said drill head housing, a track member, means movably securing said carriage member on said track member, a support member, a rotary connection between said track member and said support member providing a second axis of rotation for said track member, actuating means for rotating said drill head housing relative to said carriage member about said first axis of rotation and for rotating said track member and carriage member relative to said support member about said second axis of rotation, power transferring drive bars rotatably supported adjacent said support member, a first set of power take-off gears operatively associated with said drive bars within an access hole concentrically positioned in said support member about said second axis of rotation, power transferring drive bar extensions rotatively supported on said track member parallel to said second axis of rotation and operatively engaged with said first set of power take-off gears, a second set of power take-off gears slidably fixed on said power transferring drive bar extensions and fastened to said carriage member within an access hole therein and concentrically positioned relative to said first axis of rotation, power transfer mechanism concentrically mounted about said first axis of rotation and rotatively mounted relative to said drill head and linking said second set of power take-off gears and said spindle drive and feed mechanism whereby said drill head housing is provided with unlimited rotary movement about a rotatable axis of rotation.

8. A work supporting device comprising a trackway, carriage means slidably supported on said trackway, first table means rotatably supported on said carriage means about a central axis, first rotary connecting means extending between said first table means and said carriage means and being coaxial with said central axis, second table means supported on said first table means and being rotatable therewith, said second table means comprising upper and lower portions, second rotary connecting means extending between said upper and lower portions and being coaxial with said central axis when said second table is parallel to said first table, pivotal connecting means extending between said first table means and said second table means and defining a pivotal axis about which said second table means may be movably positioned relative to said first table means between a first position parallel and closely adjacent to said first table means and a second position inclined at an angle relative thereto, said pivotal axis being transverse to said central axis and radially outwardly located therefrom and being perpendicular to a radially extending line drawn therethrough, and said pivotal connecting means being located at a periphery of said first table means and said second table means so that all portions of said second table means move in the same direction relative to said first table means during positioning movement of said second table means about said pivotal connection.

References Cited in the file of this patent

UNITED STATES PATENTS

| | | |
|---|---|---|
| 408,259 | Pentz | Aug. 6, 1889 |
| 1,499,412 | Sears et al. | July 1, 1924 |
| 2,310,870 | Retterath | Feb. 9, 1943 |
| 2,922,323 | Weidner | Jan. 26, 1960 |

FOREIGN PATENTS

| | | |
|---|---|---|
| 2,751 | Great Britain | 1862 |
| 5,422 | Great Britain | 1911 |
| 277,394 | Switzerland | Dec. 1, 1951 |
| 474,699 | Germany | Apr. 9, 1929 |